(12) United States Patent
Hirai

(10) Patent No.: US 7,053,940 B2
(45) Date of Patent: May 30, 2006

(54) SIGNAL PROCESSING APPARATUS, METHOD, PROGRAM OF THE METHOD, AND STORAGE MEDIUM STORING THE PROGRAM FOR INTERPOLATING AN OUTPUT COLOR SIGNAL FROM AN IMAGE SENSING DEVICE

(75) Inventor: Shinya Hirai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 892 days.

(21) Appl. No.: 10/067,056

(22) Filed: Feb. 4, 2002

(65) Prior Publication Data

US 2002/0140833 A1     Oct. 3, 2002

(30) Foreign Application Priority Data

Feb. 6, 2001  (JP)  .............................. 2001-029647

(51) Int. Cl.
  *H04N 5/217*  (2006.01)
(52) U.S. Cl. ........................ 348/241; 348/241; 382/300
(58) Field of Classification Search ............. 348/222.1, 348/272, 280, 289, 290, 292, 252; 382/254, 382/300

See application file for complete search history.

(56) References Cited

U.S. PATENT DOCUMENTS

| | | | | |
|---|---|---|---|---|
| 5,202,756 A | * | 4/1993 | Sasaki et al. ............ | 348/223.1 |
| 5,325,182 A | * | 6/1994 | Murata et al. ............ | 348/663 |
| 5,333,055 A | * | 7/1994 | Murata et al. ............. | 348/239 |
| 5,382,976 A | * | 1/1995 | Hibbard ................ | 348/273 |
| 5,552,827 A | * | 9/1996 | Maenaka et al. .......... | 348/266 |
| 5,555,023 A | * | 9/1996 | Maenaka et al. .......... | 348/253 |
| 6,278,803 B1 | * | 8/2001 | Ohashi .................... | 382/254 |
| 6,295,087 B1 | | 9/2001 | Nohda | |
| 6,611,287 B1 | * | 8/2003 | Yamamoto et al. ...... | 348/222.1 |
| 6,714,242 B1 | * | 3/2004 | Kobayashi .............. | 348/272 |
| 6,853,748 B1 | * | 2/2005 | Endo et al. ............... | 382/167 |

FOREIGN PATENT DOCUMENTS

| | | |
|---|---|---|
| JP | 9-84031 | 3/1997 |
| JP | 10-150668 | 6/1998 |
| JP | 11-177994 | 7/1999 |
| JP | 2001-320720 | 11/2001 |

\* cited by examiner

*Primary Examiner*—David Ometz
*Assistant Examiner*—Kelly Jerabek
(74) *Attorney, Agent, or Firm*—Morgan & Finnegan, LLP

(57) ABSTRACT

It is an object of this invention to appropriately interpolate an image signal having a frequency close to the Nyquist frequency of an image sensing device. To achieve this object, a signal processing apparatus includes a first interpolation circuit for performing interpolation in a pixel position as an object of interpolation on the basis of pixel data in first and second directions, a second interpolation circuit for performing interpolation in a pixel position as an object of interpolation on the basis of pixel data in the first direction, a third interpolation circuit for performing interpolation in a pixel position as an object of interpolation on the basis of pixel data in the second direction, a determination circuit for determining correlations in the first and second directions with respect to a signal at a pixel position as an object of interpolation, a selection circuit for selecting interpolated data based on an output from one of the second and third interpolation circuits, on the basis of the determination result from the determination circuit, and an output unit for outputting an interpolated signal on the basis of interpolated data, which is based on an output from the first interpolation circuit, and the output interpolated data from the selection circuit.

14 Claims, 10 Drawing Sheets

FIG. 1

| R | G | R | G |
|---|---|---|---|
| G | B | G | B |
| R | G | R | G |
| G | B | G | B |

FIG. 3

| R11 | G12 | R13 | G14 | R15 |
|-----|-----|-----|-----|-----|
| G21 | B22 | G23 | B24 | G25 |
| R31 | G32 | R33 | G34 | R35 |
| G41 | B42 | G43 | B44 | G45 |
| R51 | G52 | R53 | G54 | R55 |

F I G. 7A $\quad Av = \begin{bmatrix} 0 & -1 & -2 & -1 & 0 \\ 1 & 2 & 2 & 2 & 1 \\ 0 & -1 & -2 & -1 & 0 \end{bmatrix}$

F I G. 7B $\quad Ah = \begin{bmatrix} 0 & 1 & 0 \\ -1 & 2 & -1 \\ -2 & 2 & -2 \\ -1 & 2 & -1 \\ 0 & 1 & 0 \end{bmatrix}$

SIGNAL PROCESSING APPARATUS, METHOD, PROGRAM OF THE METHOD, AND STORAGE MEDIUM STORING THE PROGRAM FOR INTERPOLATING AN OUTPUT COLOR SIGNAL FROM AN IMAGE SENSING DEVICE

FIELD OF THE INVENTION

The present invention relates to a signal processing apparatus which is suitably used as, e.g., a digital still camera and which generates a luminance signal or a color signal from an output from an image sensing device having a plurality of different types of filters, and to a signal processing method of the apparatus.

BACKGROUND OF THE INVENTION

In a conventional single-sensor camera using an image sensing device such as a CCD, a color filter of one of a plurality of types (e.g., one of three colors R, G, and B) is formed for each pixel of the image sensing device. For example, the Bayer arrangement shown in FIG. 1 is well known.

In a single-sensor camera having this Bayer arrangement, color information of only one of R, G, and B is obtained by each pixel. To obtain color information of all of R, G, and B in each pixel, therefore, interpolation must be performed in a subsequent circuit. The simplest interpolation method is to set 0 as all color signal levels except for a color signal to be interpolated, and perform two-dimensional, low-pass filter (LPF) processing for each pixel, thereby obtaining an interpolated value.

Unfortunately, if this two-dimensional LPF processing alone is simply performed as described above, high-frequency components are lost from the frequency characteristics of the interpolated image, and this blurs the image.

To solve this problem, a method by which the LPF processing is changed in accordance with the characteristics of an image has been proposed. For example, if a certain portion of an image is found to be a vertical stripe, the LPF processing is performed only in the lateral direction of the image; if a certain portion of an image is found to be a lateral stripe, the LPF processing is performed only in the longitudinal direction of the image. If a certain portion of an image is found to be a wave intermediate between vertical and lateral stripes, the LPF processing in the lateral direction of the image and the LPF processing in the longitudinal direction of the image are weighted in accordance with the degree of the wave, thereby interpolating a color signal.

However, the above conventional method does not take into account the sensing of an image (e.g., a vertically striped pattern or laterally striped pattern) having a frequency close to the Nyquist frequency of the image sensing device.

A frequency close to the Nyquist frequency of the image sensing device is a folded signal, so it is difficult to determine whether the image is a vertical or lateral stripe. This may lead to erroneous determination between vertical and lateral stripes. For example, although an actual object is a lateral stripe, the longitudinal LPF processing may be performed by mistake for a certain pixel to be interpolated, whereas the lateral LPF processing is performed for the next pixel to be interpolated. That is, appropriate color signal interpolation may not be performed continuously.

SUMMARY OF THE INVENTION

The present invention has been made in consideration of the above prior art, and has as its object to provide a signal processing apparatus or signal processing method capable of performing appropriate color signal interpolation even when an image signal close to the Nyquist frequency of an image sensing device exists.

To achieve the above object, according to an invention of the present application, a signal processing apparatus for interpolating an output color signal from an image sensing device is characterized by comprising first interpolating device that performs interpolation in a pixel position as an object of interpolation on the basis of pixel data in first and second directions, second interpolating device that performs interpolation in a pixel position as an object of interpolation on the basis of pixel data in the first direction, third interpolating device that performs interpolation in a pixel position as an object of interpolation on the basis of pixel data in the second direction, determining device that determines correlations in the first and second directions with respect to a signal at a pixel position as an object of interpolation, selecting device that selects interpolated data based on an output from one of the second and third interpolating device, on the basis of the determination result from the determining device, and output device that outputs an interpolated signal on the basis of interpolated data, which is based on an output from the first interpolating device, and the output interpolated data from the selecting device.

According to another invention of the present application, a signal processing method of interpolating an output color signal from an image sensing device is characterized by comprising the first interpolation step of performing interpolation in a pixel position as an object of interpolation on the basis of pixel data in first and second directions, the second interpolation step of performing interpolation in a pixel position as an object of interpolation on the basis of pixel data in the first direction, the third interpolation step of performing interpolation in a pixel position as an object of interpolation on the basis of pixel data in the second direction, the selection step of determining correlations in the first and second directions with respect to a signal at a pixel position as an object of interpolation and, on the basis of the determination result, selecting interpolated data based on an output from one of the second and third interpolation steps, and the output step of outputting an interpolated signal on the basis of interpolated data, which is based on an output from the first interpolation step, and the output interpolated data from the selection step.

According to still another invention of the present application, in a storage medium storing an operation process program for interpolating an output color signal from an image sensing device, the operation process program comprises the first interpolation step of performing interpolation in a pixel position as an object of interpolation on the basis of pixel data in first and second directions, the second interpolation step of performing interpolation in a pixel position as an object of interpolation on the basis of pixel data in the first direction, the third interpolation step of performing interpolation in a pixel position as an object of interpolation on the basis of pixel data in the second direction, the selection step of determining correlations in the first and second directions with respect to a signal at a pixel position as an object of interpolation and, on the basis of the determination result, selecting interpolated data based on an output from one of the second and third interpolation steps, and the output step of outputting an interpolated signal on the basis of interpolated data, which is based on an output from the first interpolation step, and the output interpolated data from the selection step.

According to still another invention of the present application, an operation process program for interpolating an output color signal from an image sensing device comprises the first interpolation step of performing interpolation in a pixel position as an object of interpolation on the basis of pixel data in first and second directions, the second interpolation step of performing interpolation in a pixel position as an object of interpolation on the basis of pixel data in the first direction, the third interpolation step of performing interpolation in a pixel position as an object of interpolation on the basis of pixel data in the second direction, the selection step of determining correlations in the first and second directions with respect to a signal at a pixel position as an object of interpolation and, on the basis of the determination result, selecting interpolated data based on an output from one of the second and third interpolation steps, and the output step of outputting an interpolated signal on the basis of interpolated data, which is based on an output from the first interpolation step, and the output interpolated data from the selection step.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 1 is a view showing the Bayer arrangement as a color filter arrangement in a single-sensor image sensing device;

FIG. 3 is a view showing a color filter arrangement in an image sensing device according to the first embodiment;

FIGS. 7A and 7B are views showing examples of HPF in the second embodiment;

DETAILED DESCRIPTION OF THE PREFERRED EMBODIMENTS

Figure 1:
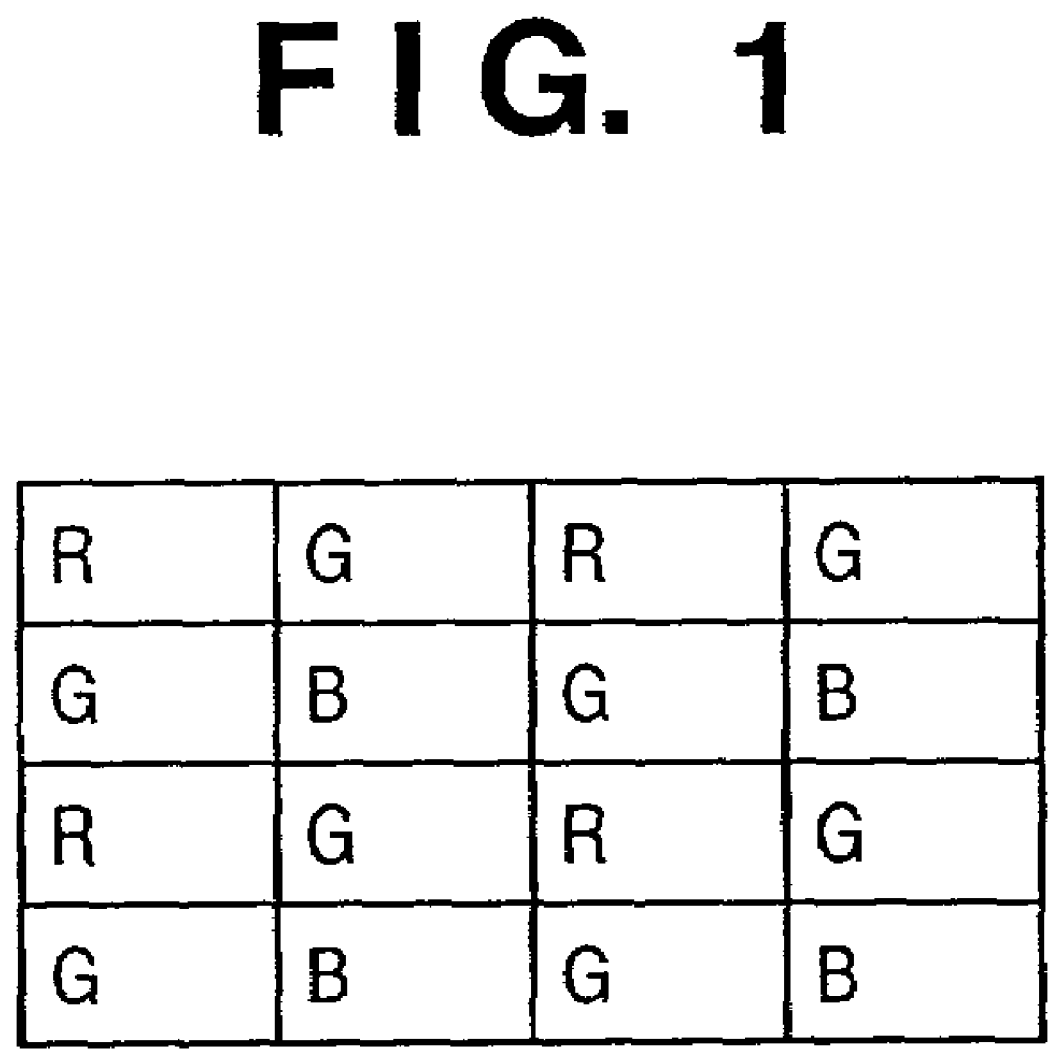

Preferred embodiments of the present invention will now be described in detail in accordance with the accompanying drawings. Note that each embodiment will be explained by using the Bayer arrangement shown in FIG. 1 as a color filter arrangement of an image sensing device. However, another color filter arrangement is also usable.

(First Embodiment)

Figure 2:
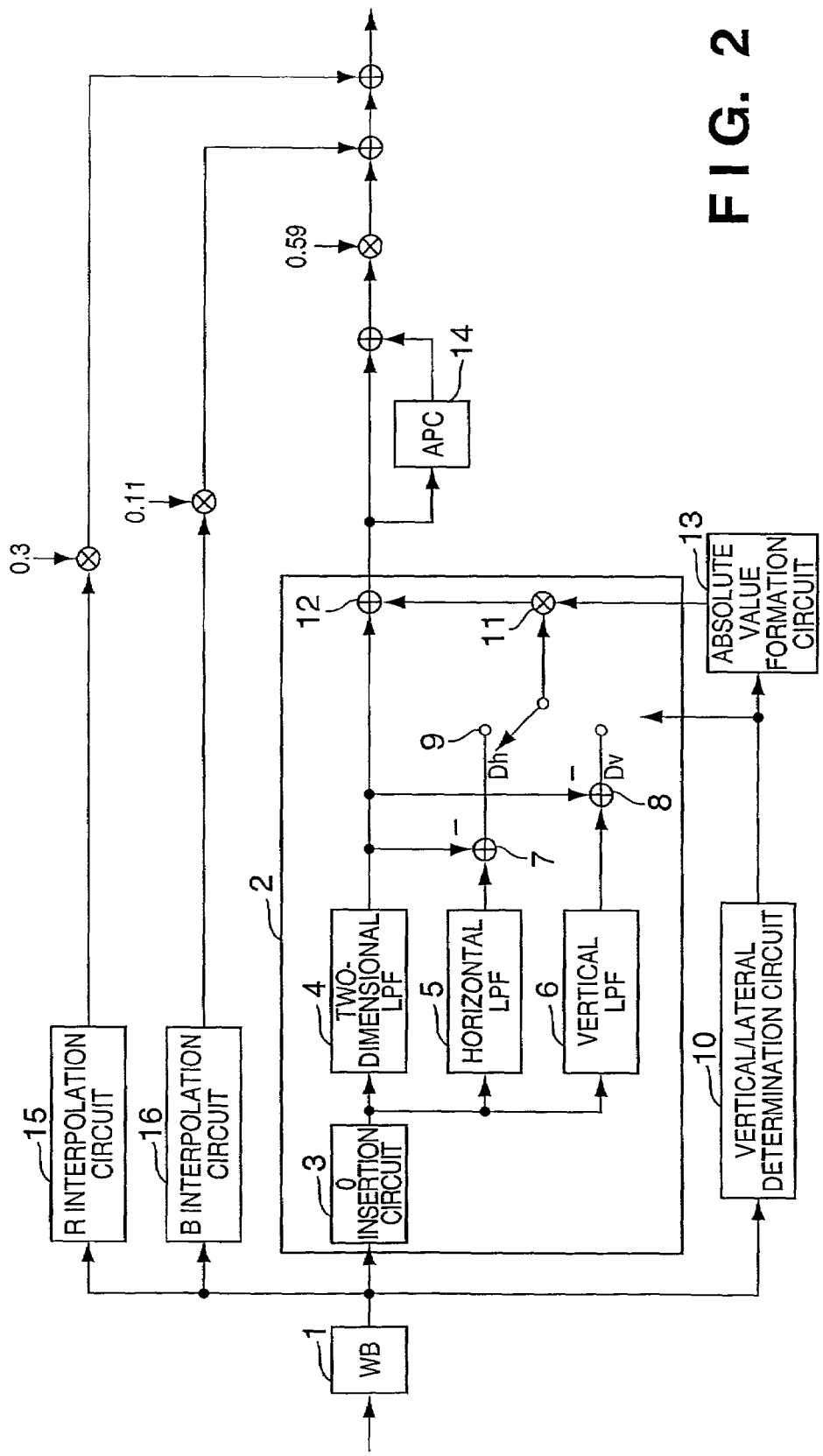
FIG. 2 is a block diagram showing an outline of a signal processing apparatus according to the first embodiment.

FIG. 2 is a block diagram showing an outline of the arrangement of a signal processing apparatus according to the first embodiment.

Referring to FIG. 2, a WB (White Balance) circuit 1 corrects the white balance of an image signal. This WB circuit 1 receives an image signal which is output from an image sensing device and A/D-converted.

A G interpolation circuit 2 performs G signal interpolation for each pixel. Likewise, an R interpolation circuit 15 performs R signal interpolation, and a B interpolation circuit 16 performs B signal interpolation.

A vertical/lateral determination circuit 10 determines whether an image is a vertical stripe, a lateral stripe, or an intermediate between them. An absolute value formation circuit 13 changes an output parameter signal from the vertical/lateral determination circuit 10 into an absolute value. Note that the processes in the vertical/lateral determination circuit 10 and the absolute value formation circuit 13 will be described later.

An APC circuit 14 corrects the aperture of the output G signal from the G interpolation circuit 2. This APC circuit for performing aperture correction is also placed in the subsequent stage of each of the R interpolation circuit 15 and the B interpolation circuit 16.

By the above interpolation processes, all of R, G, and B signals corresponding to individual pixel positions are obtained. In addition, a luminance signal Y is obtained by the subsequent process in accordance with $$Y=0.3R+0.59G+0.11B$$

For the sake of descriptive simplicity, only interpolation for a G signal will be explained in the first and other embodiments. Interpolation for R and B signals is linearly performed.

The internal configuration of the G interpolation circuit 2 will be explained below.

A 0 insertion circuit 3 sets 0 as the output signal levels of pixels other than a pixel having a color to be interpolated, i.e., a pixel having a G filter.

A two-dimensional LPF 4 interpolates an image signal which is close to the Nyquist frequency and which is not easily found to be a vertical stripe or lateral stripe. This two-dimensional LPF 4 performs interpolation by using pixels in a two-dimensional range very close to the position of a pixel to be interpolated, so that no image blur occurs.

A horizontal LPF (Low Pass Filter) 5 performs interpolation by using an image signal in the lateral direction (horizontal direction) with respect to the position of a pixel to be interpolated. In this embodiment, this horizontal LPF 5 performs interpolation by using an image signal within a range wider than that of the image signal used by the two-dimensional LPF 4, in the horizontal direction of the position of a pixel to be interpolated.

A vertical LPF 6 performs interpolation by using an image signal in the longitudinal direction with respect to the position of a pixel to be interpolated. In this embodiment, this vertical LPF 6 performs interpolation by using an image signal within a range wider than that of the image signal used by the two-dimensional LPF 4, in the vertical direction of the position of a pixel to be interpolated.

An adder 7 calculates the difference between the output from the two-dimensional LPF 4 and the output from the horizontal LPF 5. An adder 8 calculates the difference between the output from the two-dimensional LPF 4 and the output from the vertical LPF 6. A switch 9 selects the output from the adder 7 or 8 on the basis of the determination result from the vertical/lateral determination circuit 10. A multiplier 11 multiplies the signal output selected by the switch 9 by the output from the absolute value formation circuit 13. An adder 12 adds the output from the two-dimensional LPF 4 and the output from the multiplier 11.

Figure 5:
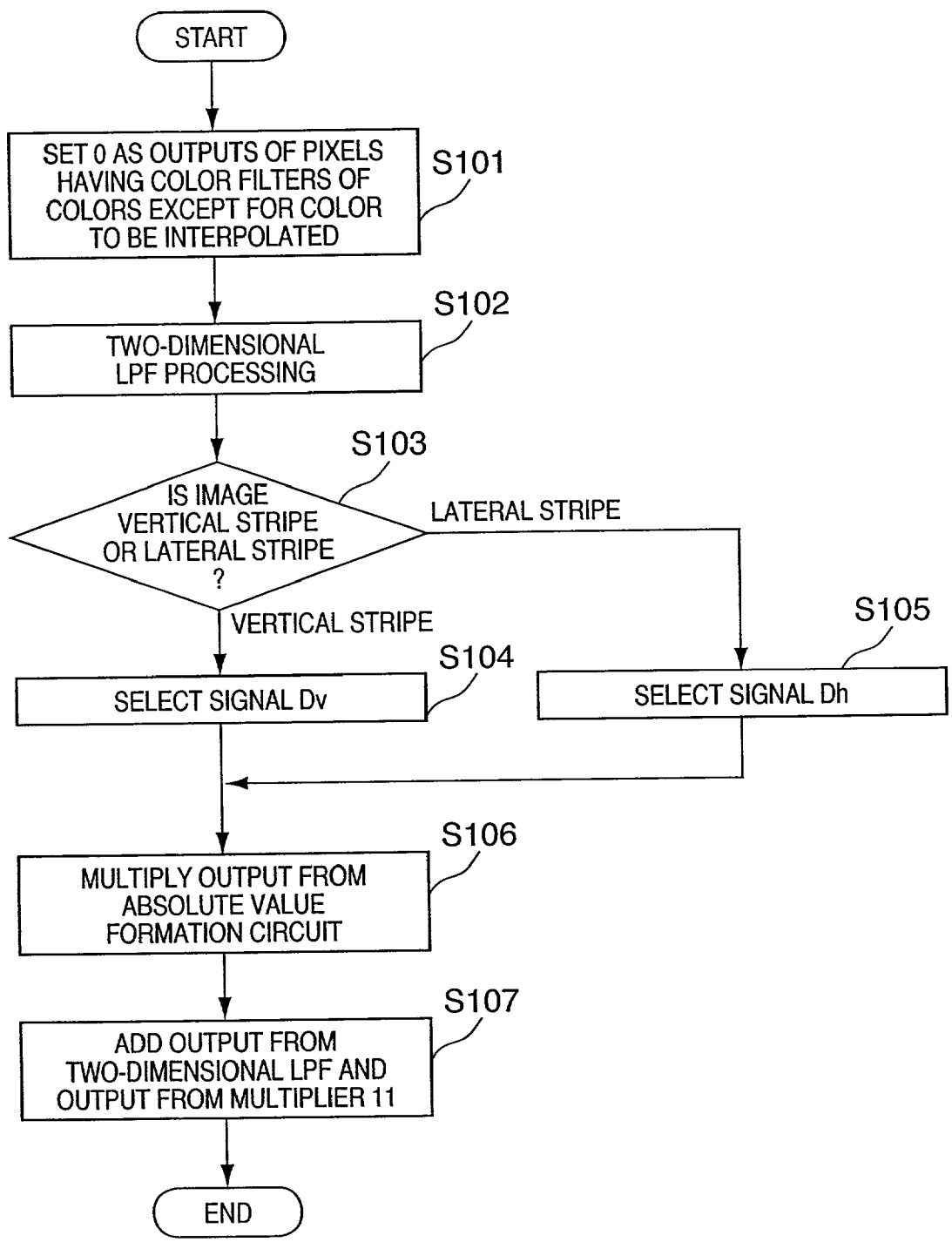
FIG. 5 is an operation process flow chart of the signal processing apparatus according to the first embodiment of the present invention.

FIG. 5 is an operation process flow chart concerning image signal (G signal) interpolation in the first embodiment. FIG. 3 is a view clearly showing pixel positions in the color filter arrangement shown in FIG. 1. The interpolation process of this embodiment will be described below with reference to FIGS. 3 and 5.

First, in S101, the 0 insertion circuit 3 inserts 0 in pixels corresponding to color filters except for G, i.e., color filters of R and B.

The flow advances to S102, and the two-dimensional LPF 4 performs pixel interpolation for the output signal from the 0 insertion circuit 3, thereby obtaining a two-dimensional G interpolated signal. This two-dimensional LPF 4 is so configured as to perform interpolation of [1 2 1 ]/2 by using pixel data in the vertical direction and interpolation of [1 2 1 ]/2 by using pixel data in the horizontal direction. For example, an interpolated value G33' at a pixel position R33 shown in FIG. 3 is in the vertical direction $$(1 \times G32 + 2 \times R33 + 1 \times G34)/2 = (G32 + G34)/2$$

and in the horizontal direction $$(1 \times G23 + 2 \times R33 + 1 \times G43)/2 = (G23 + G43)/2$$

Therefore, by calculating the average, $$G33' = (G32 + G34 + G23 + G43)/4$$

The flow advances to S103, and the vertical/lateral determination circuit 10 checks whether the pixel signal to be interpolated has a large correlation in the vertical direction or in the horizontal direction. More specifically, the vertical/lateral determination circuit 10 checks whether the image is a vertically striped pattern or a laterally striped pattern.

The determination method in this vertical/lateral determination circuit will be described below. Assume, for example, that the position of a pixel to be interpolated is R33.

$$\text{diff}HV33 = \text{diff}H33 - \text{diff}V33$$

$$\text{diff}H33 = |G32 - G34| + |2R33 - R31 - R35|$$

$$\text{diff}V33 = |G23 - G43| + |2R33 - R13 - R53|$$

Note that diffH indicates a level difference between pixels, in the horizontal direction, centering around the pixel to be interpolated, and diffV indicates a level difference between pixels, in the vertical direction, centering around the pixel to be interpolated. Note also that diffHV indicates the difference of the level difference between the pixels in the vertical direction from the level difference between the pixels in the horizontal direction. That is, if diffHV is positive, the image is a vertically striped pattern; if diffHV is negative, the image is a laterally striped pattern. The value of diffHV is set within the range of −1 to 1 by clipping the calculated value by a certain threshold value and normalizing this clipped value. Note that an expression for calculating diffHV is not restricted to the above one.

If diffHV>0, i.e., if the image is found to be a vertically striped pattern, the flow advances to S104. If diffHV<0, i.e., if the image is found to be a laterally striped pattern, the flow advances to S105.

In S104, the switch 9 selects an output signal Dv from the adder 8. Note that the vertical LPF 6 is so configured as to perform interpolation of [1 4 6 4 1]/8 by using pixel data in the vertical direction. For example, when the pixel position R33 is the object of interpolation, an output value Gv33 from the vertical LPF 6 is $$Gv33 = (1 \times R13 + 4 \times G23 + 6 \times R33 + 4 \times G43 + 1 \times R53)/8$$
$$= (G23 + G43)/2$$

Accordingly, when the pixel position R33 is the object of interpolation, the output difference signal Dv from the adder 8 is $$Dv33 = Gv33 - G33' = (G23 + G43 - G32 - G34)/4$$

In S105, on the other hand, the switch 9 selects an output signal Dh from the adder 7. Note that the horizontal LPF 5 is so configured as to perform interpolation of [1 4 6 4 1]/8 by using pixel data in the horizontal direction. For example, when the pixel position R33 is the object of interpolation, an output value Gh33 from the horizontal LPF 5 is $$Gh33 = (1 \times R31 + 4 \times G32 + 6 \times R33 + 4 \times G34 + 1 \times R35)/8$$
$$= (G32 + G34)/2$$

Accordingly, when the pixel position R33 is the object of interpolation, the output difference signal Dh from the adder 7 is $$Dh33 = Gh33 - G33' = (G32 + G34 - G23 - G43)/4$$

In S106, the multiplier 11 multiplies the signal selected by the switch 9 by the output from the absolute value formation circuit 13. This absolute value formation circuit 13 outputs a signal as the absolute value of diffHV. In S107, the output from the two-dimensional LPF 4 and the output from the multiplier 11 are added to output a final interpolated signal G.

By the processing explained above, appropriate interpolation is performed. For example, if it is difficult to distinguish between vertical and lateral stripes owing to the influence of an image signal near the Nyquist frequency, the value of diffHV is small, so the multiplier 11 decreases the value of Gh or Gv. That is, the output interpolated data from the two-dimensional LPF 4 is weighted by the output interpolated data Gh or Gv. This suppresses the influence of a folded signal and makes it possible to perform appropriate interpolation.

Also, if diffHV=1, i.e., if an object is found to be a vertically striped pattern, the switch 9 selects Dv, and this Dv is multiplied by |1|. As a consequence, the output interpolated data from the multiplier 11 is weighted. When the pixel position R33 is the object of interpolation, for example, the output (i.e., the final interpolated signal G) from the adder 12 is $$G33 = G33' + Dv33 = (G23 + G43)/2$$

This prevents deterioration of the characteristics in the longitudinal direction.

If diffHV=−1, i.e., if the object is found to be a laterally striped pattern, the switch 9 selects Dh, and this Dh is multiplied by |−1|. Consequently, the output interpolated data from the multiplier 11 is weighted. When the pixel position R33 is the object of interpolation, for example, the output (i.e., the final interpolated signal G) from the adder 12 is $$G33=G33'+Dh33=(G32+G34)/2$$

This prevents deterioration of the characteristics in the longitudinal direction (vertical direction) of the image.

(Second Embodiment)

Figure 6:
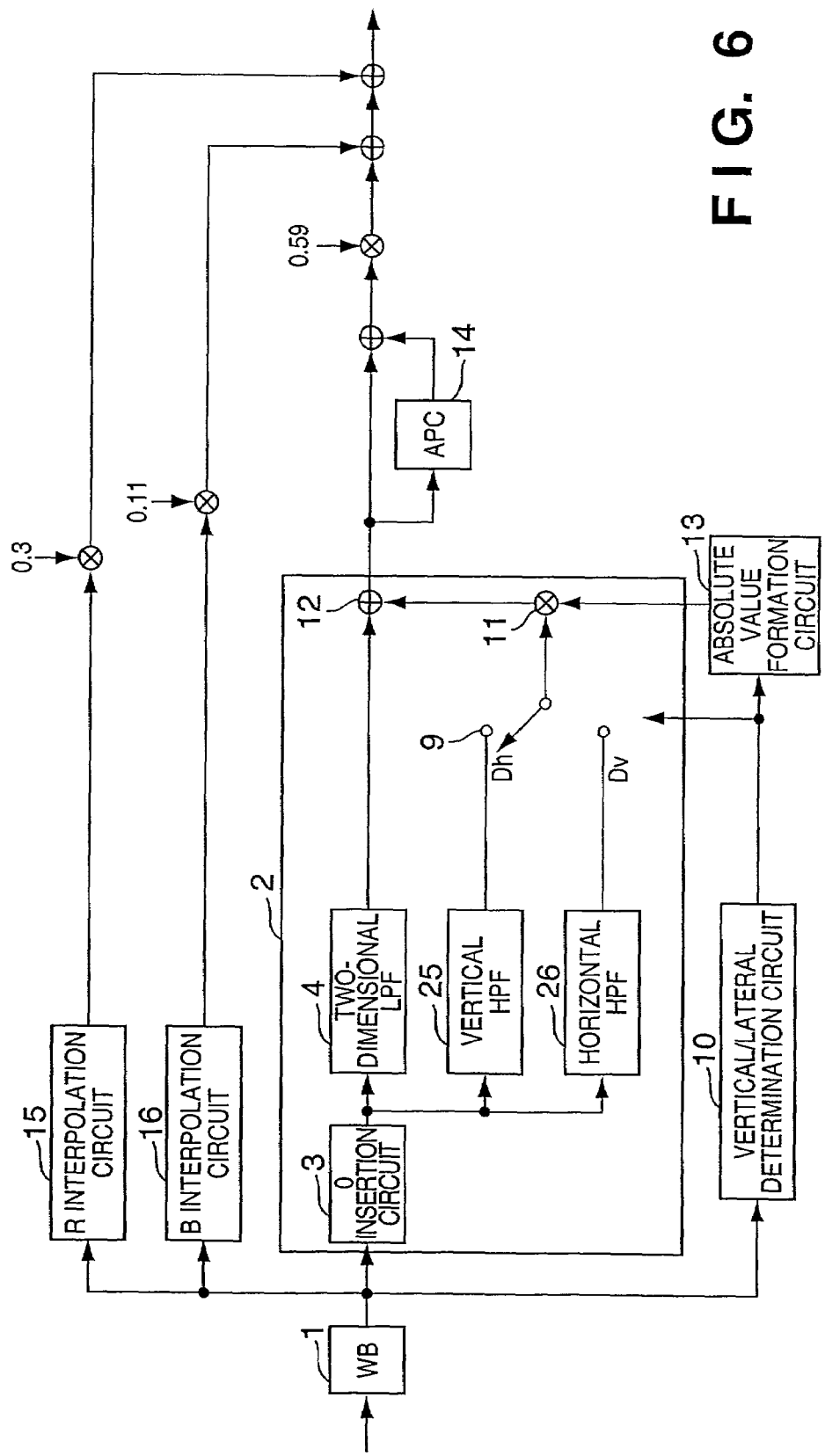
FIG. 6 is a block diagram showing an outline of a signal processing apparatus according to the second embodiment.

FIG. 6 is a block diagram of a signal processing apparatus in the second embodiment. This configuration shown in FIG. 6 is equivalent to a configuration in which the horizontal LPF 5 and the adder 7 shown in FIG. 2 are replaced with a vertical HPF (High Pass Filter) 25 and the vertical LPF 6 and the adder 8 shown in FIG. 2 are replaced with a horizontal HPF 26. The same reference numerals as in FIG. 2 denote parts which perform the same processes, and a detailed description thereof will be omitted.

The vertical HPF 25 has a filter characteristic shown in FIG. 7A. That is, the output from this vertical HPF 25 is the same as the signal of the difference between the output from the horizontal LPF 5 and the output from the two-dimensional LPF in the first embodiment. For example, when a pixel position R33 shown in FIG. 3 is the object of interpolation, an output signal Dh from the vertical HPF 25 is $$Dh33=Gh33-G33'=(G32+G34-G23-G43)/4$$

The horizontal HPF 26 has a filter characteristic shown in FIG. 7B. That is, the output from this horizontal HPF 26 is the same as the signal of the difference between the output from the vertical LPF 6 and the output from the two-dimensional LPF in the first embodiment. For example, when the pixel position R33 shown in FIG. 3 is the object of interpolation, an output signal Dv from the horizontal HPF 26 is $$Dv33=Gv33-G33'=(G23+G43-G32-G34)/4$$

This second embodiment can also achieve the same effects as in the first embodiment.

(Third Embodiment)

Figure 8:
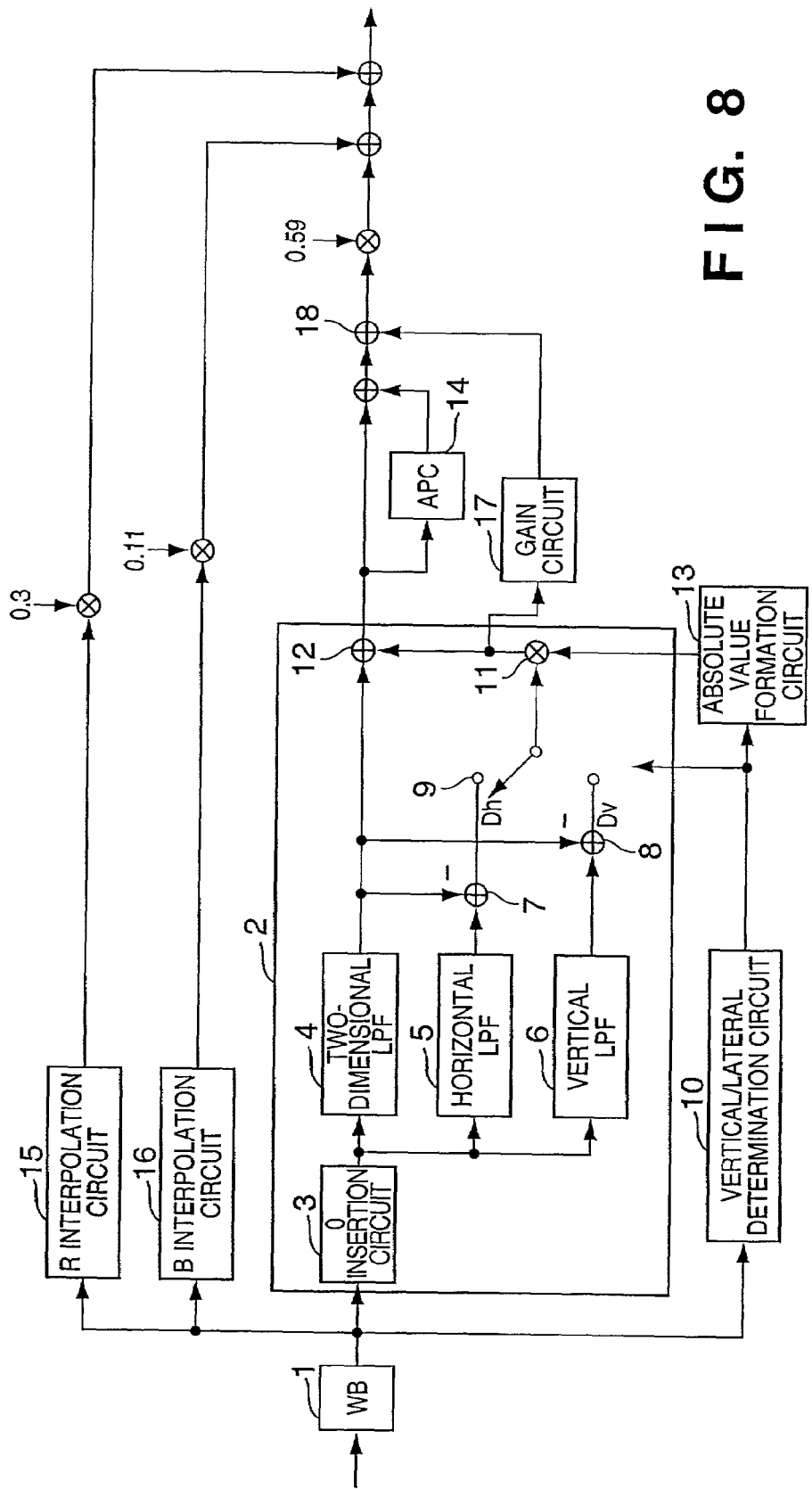
FIG. 8 is a block diagram showing an outline of a signal processing apparatus according to the third embodiment.

FIG. 8 is a block diagram showing the arrangement of a signal processing apparatus according to the third embodiment. This signal processing apparatus of the third embodiment has a configuration in which a gain circuit 17 and an adder 18 are added to the signal processing apparatus of the first embodiment shown in FIG. 2. In this block diagram shown in FIG. 8, the same reference numerals as in FIG. 2 denote parts which perform the same processes, so a detailed description thereof will be omitted.

The gain circuit 17 amplifies an output signal from a multiplier 11. The output signal from this gain circuit 17 is added to an output image signal from an APC circuit 14 by the adder 18. That is, the output difference signal from the multiplier 11 is a high-frequency signal adaptively selected in accordance with the pattern of an image. For example, when an image is a vertically or laterally striped pattern, the output level from the multiplier is large, so the high-frequency signal is emphasized; if it is impossible to identify the pattern of an image, emphasis of the high-frequency signal is suppressed. That is, adaptive favorable emphasis can be performed for the high-frequency portion of an interpolated signal.

Also, as described above, the output from the multiplier 11 is used as a signal for emphasizing the high-frequency component of an image. That is, in this embodiment a G interpolation circuit 2 is also used as a circuit for emphasizing the high-frequency signal of an image. This simplifies the circuit configuration.

(Fourth Embodiment)

Figure 9:
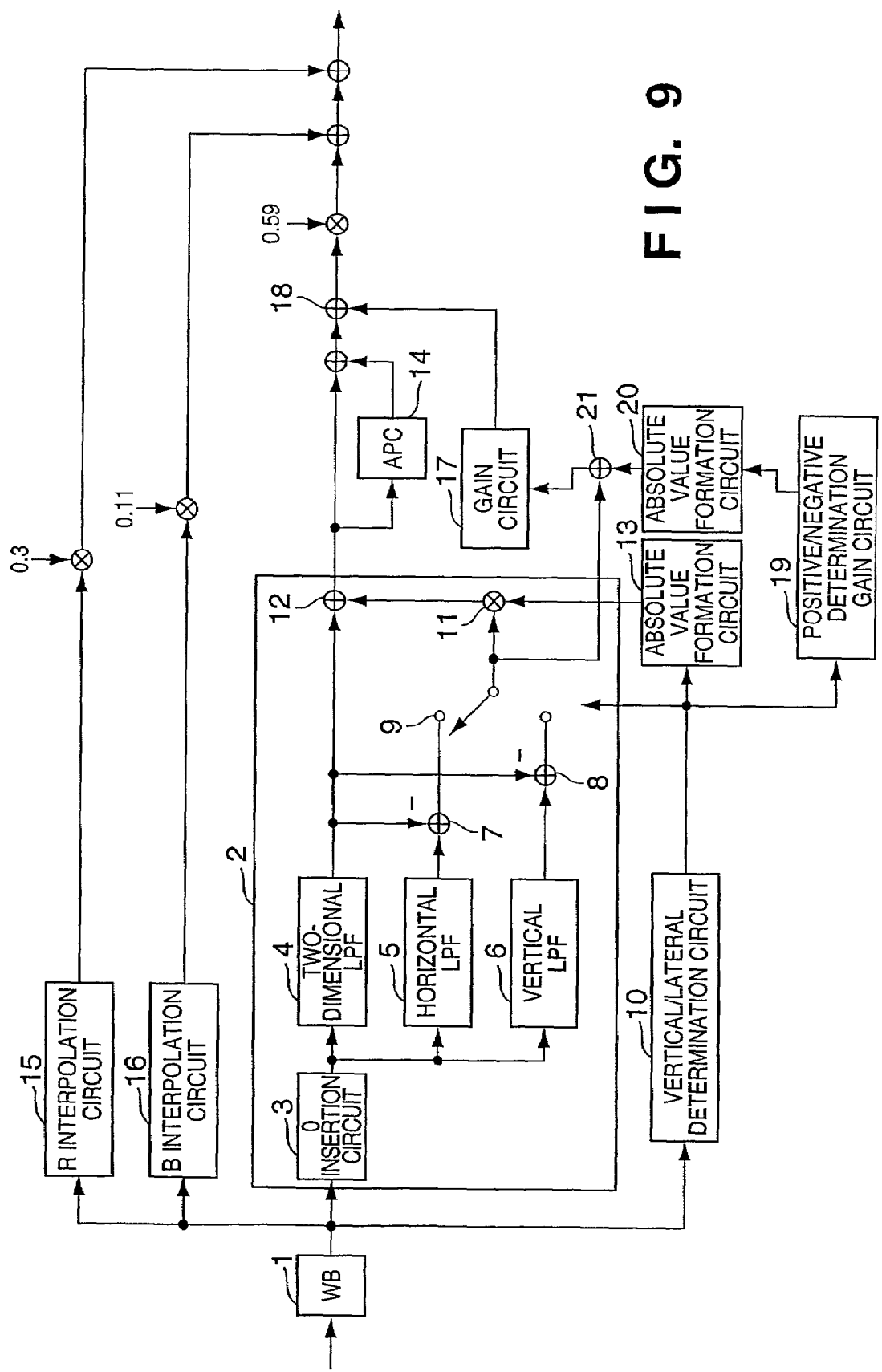
FIG. 9 is a block diagram showing an outline of a signal processing apparatus according to the fourth embodiment.

FIG. 9 is a block diagram showing the arrangement of a signal processing apparatus according to the fourth embodiment. This signal processing apparatus of the fourth embodiment has a configuration in which a gain circuit 17, an adder 18, a positive/negative determination gain circuit 19, an absolute value formation circuit 20, and an adder 21 are added to the signal processing apparatus of the first embodiment shown in FIG. 2. In this block diagram shown in FIG. 9, the same reference numerals as in FIG. 2 denote parts which perform the same processes, so a detailed description thereof will be omitted.

In the fourth embodiment, a determination signal diffHV from a vertical/lateral determination circuit 10 is blanched. One determination signal is processed in the same manner as in the first embodiment. The other determination signal is supplied to the positive/negative determination gain circuit 19 where a desired gain is applied only to a positive or negative signal.

Figure 10:
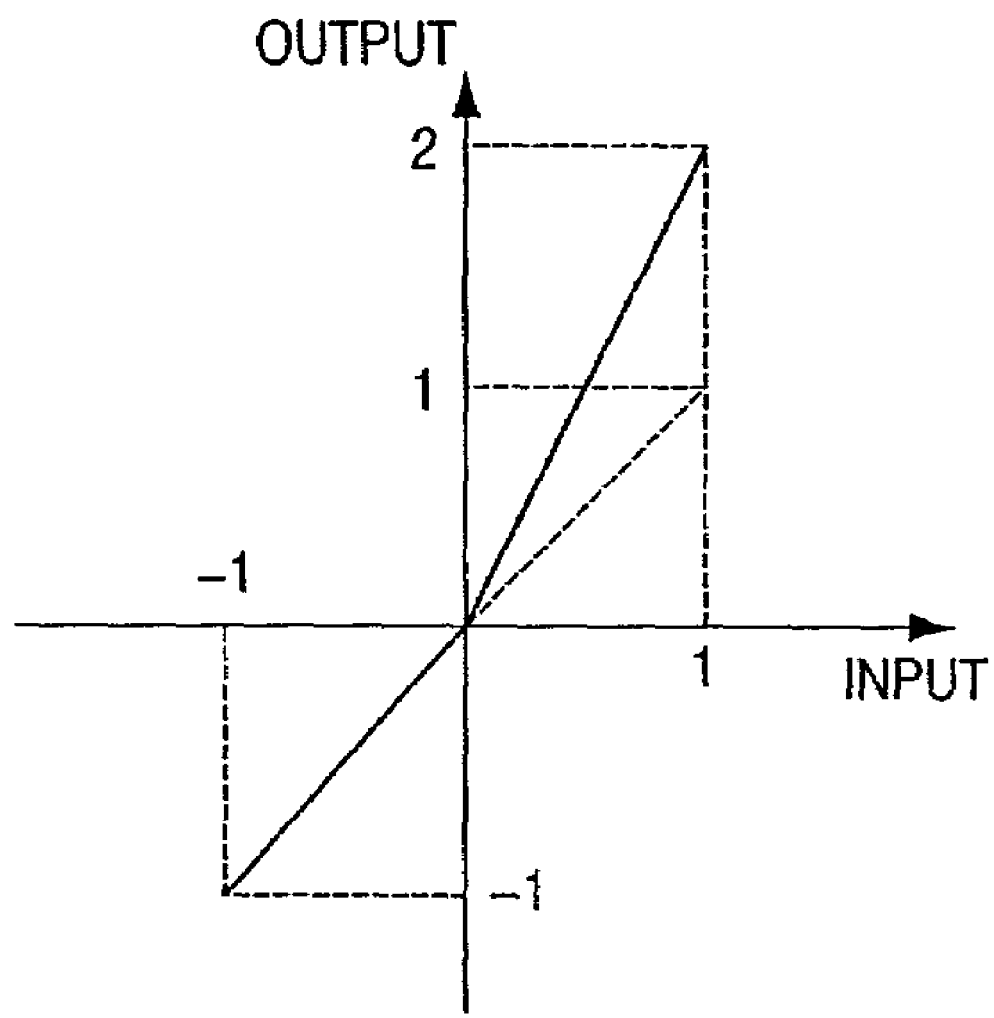
FIG. 10 is a graph for explaining a positive/negative determination gain circuit 19 of the fourth embodiment.

For example, when a twofold gain is applied only to a positive signal, the range of the determination signal which is from −1 to 1 changes to −1 to 2 as shown in FIG. 10.

The absolute value formation circuit 20 changes this determination signal into an absolute value. The gain circuit 17 emphasizes the signal, and the adder 18 adds the signal to a G interpolated signal. The result is a G interpolated signal in which the degree of high frequency emphasis in the horizontal direction differs from that in the vertical direction.

(Other Embodiments)

Figure 4:
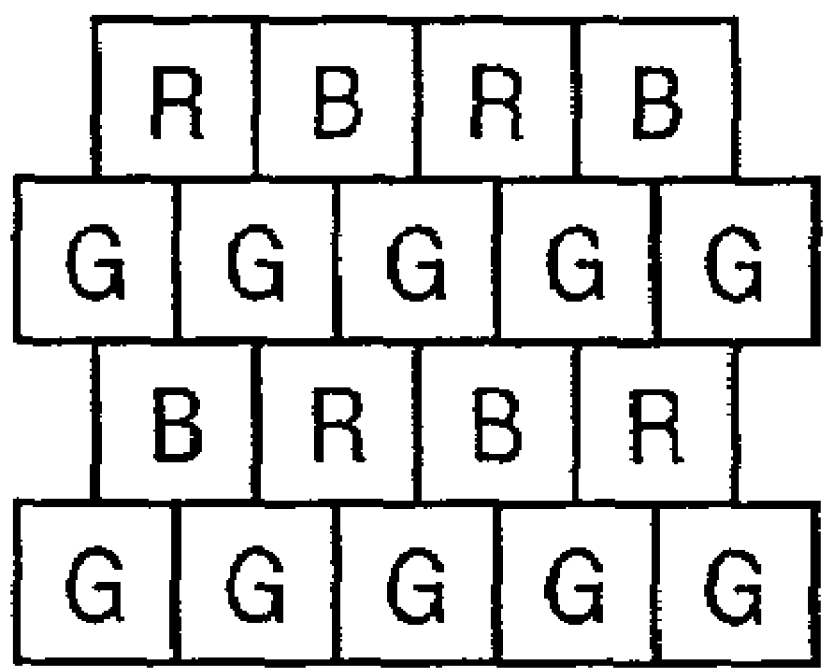
FIG. 4 is a view showing an offset sampling arrangement as a color filter arrangement in a single-sensor image sensing device.

The present invention is also applicable to an image sensing device having a structure in which pixels are offset by a half pixel pitch every horizontal line as shown in FIG. 4. In this structure, the processing of each of the above embodiments can be implemented by replacing the vertical correlation processing with oblique correlation processing.

As an example, the present invention can be achieved by supplying program codes of software for implementing the functions of the above-mentioned embodiments to a signal processing apparatus via a network such as the Internet, and reading out and executing the program codes stored in a storage medium by a computer (or a CPU or MPU) of the signal processing apparatus.

In this case, the program codes read out from the storage medium implement the functions of the above embodiments, and the storage medium storing the program codes constitutes the invention.

As this storage medium for supplying the program codes, it is possible to use, e.g., a floppy disk, hard disk, optical disk, magneto optical disk, CD-ROM, CD-R, magnetic tape, nonvolatile memory card, and ROM.

Also, besides the functions of the above embodiments are implemented by executing the readout program codes by the computer, the present invention includes a case where an OS (Operating System) or the like running on the computer performs part or the whole of actual processing in accordance with designations by the program codes and thereby implements the functions of the above embodiments.

Furthermore, the present invention also includes a case where the program codes read out from the storage medium are written in a memory of a function extension board inserted into the computer or of a function extension unit connected to the computer, and, in accordance with designations by the program codes, a CPU or the like of the function extension board or function extension unit performs part or the whole of actual processing and thereby implements the functions of the above embodiments.

When the present invention is applied to the storage medium described above, this storage medium stores program codes corresponding to the flow charts explained previously. Briefly, modules essential to the signal processing apparatus of the present invention are stored in the storage medium.

In the above embodiments as described above, on the basis of correlations of directions (e.g., horizontal and vertical directions) with respect to the position of a pixel to be interpolated, it is checked whether to give importance to data interpolated on the basis of pixel data in two-dimensional directions, or to data interpolated on the basis of pixel data in one direction. Therefore, when an image is found to be a vertically striped pattern or a laterally striped pattern, the frequency characteristics of the image do not deteriorate. Also, even if an image can be either a vertically striped pattern or a laterally striped pattern, no adverse influence is exerted by a folded signal or the like.

The present invention is not limited to the above embodiments and various changes and modifications can be made within the spirit and scope of the present invention. Therefore, to apprise the public of the scope of the present invention the following claims are made.

What is claimed is:

1. A signal processing apparatus for interpolating an output color signal from an image sensing device, comprising:
    first interpolating device that performs interpolation in a pixel position as an object of interpolation on the basis of pixel data in first and second directions;
    second interpolating device that performs interpolation in a pixel position as an object of interpolation on the basis of pixel data in the first direction;
    third interpolating device that performs interpolation in a pixel position as an object of interpolation on the basis of pixel data in the second direction;
    determining device that determines correlations in the first and second directions with respect to a signal at a pixel position as an object of interpolation;
    selecting device that selects interpolated data based on an output from one of said second and third interpolating device, on the basis of the determination result from said determining device; and
    output device that outputs an interpolated signal on the basis of interpolated data, which is based on an output from said first interpolating device, and the output interpolated data from said selecting device,
    wherein if said determining device is expected to determine that the correlations in the first and second directions would become equal, said output device generates the interpolated signal by performing weighting such that the interpolated data based on the output from said first interpolating device is weighted more than the output interpolated data from said selecting device.

2. The apparatus according to claim 1, wherein said image sensing device has color filters having a Bayer arrangement.

3. The apparatus according to claim 1, wherein in said image sensing device, pixels are offset.

4. A signal processing apparatus for interpolating an output color signal from an image sensing device, comprising:
    first interpolating device that performs interpolation in a pixel position as an object of interpolation on the basis of pixel data in first and second directions;
    second interpolating device that performs interpolation in a pixel position as an object of interpolation on the basis of pixel data in the first direction;
    third interpolating device that performs interpolation in a pixel position as an object of interpolation on the basis of pixel data in the second direction;
    determining device that determines correlations in the first and second directions with respect to a signal at a pixel position as an object of interpolation;
    selecting device that selects interpolated data based on an output from one of said second and third interpolating device, on the basis of the determination result from said determining device; and
    output device that outputs an interpolated signal on the basis of interpolated data, which is based on an output from said first interpolating device, and the output interpolated data from said selecting device,
    wherein said second interpolating device performs interpolation on the basis of pixel data, in the first direction, over a broader range than that when said first interpolating device performs interpolation.

5. A signal processing apparatus for interpolating an output color signal from an image sensing device, comprising:
    first interpolating device that performs interpolation in a pixel position as an object of interpolation on the basis of pixel data in first and second directions;
    second interpolating device that performs interpolation in a pixel position as an object of interpolation on the basis of pixel data in the first direction;
    third interpolating device that performs interpolation in a pixel position as an object of interpolation on the basis of pixel data in the second direction;
    determining device that determines correlations in the first and second directions with respect to a signal at a pixel position as an object of interpolation;
    selecting device that selects interpolated data based on an output from one of said second and third interpolating device, on the basis of the determination result from said determining device; and
    output device that outputs an interpolated signal on the basis of interpolated data, which is based on an output from said first interpolating device, and the output interpolated data from said selecting device,
    wherein said third interpolating device performs interpolation on the basis of pixel data, in the second direction, over a broader range than that when said first interpolating device performs interpolation.

6. A signal processing apparatus for interpolating an output color signal from an image sensing device, comprising:
    first interpolating device that performs interpolation in a pixel position as an object of interpolation on the basis of pixel data in first and second directions;
    second interpolating device that performs interpolation in a pixel position as an object of interpolation on the basis of pixel data in the first direction;
    third interpolating device that performs interpolation in a pixel position as an object of interpolation on the basis of pixel data in the second direction;
    determining device that determines correlations in the first and second directions with respect to a signal at a pixel position as an object of interpolation;
    selecting device that selects interpolated data based on an output from one of said second and third interpolating device, on the basis of the determination result from said determining device; and output device that outputs an interpolated signal on the basis of interpolated data, which is based on an output from said first interpolating device, and the output interpolated data from said selecting device, wherein said selecting device selects one of a difference between the output interpolated data from said second interpolating device and the output interpolated data from said first interpolating device, and a difference between the output interpolated data from said third interpolating device and the output interpolated data from said first interpolating device.

7. The apparatus according to claim 6, wherein if said determining device determines that a pixel position as an object of interpolation has a higher correlation in the second direction than in the first direction, said selecting device selects a difference between the output interpolated data from said second interpolating device and the output interpolated data from said first interpolating device.

8. The apparatus according to claim 6, wherein if said determining device determines that a pixel position as an object of interpolation has a higher correlation in the first direction than in the second direction, said selecting device selects a difference between the output interpolated data from said third interpolating device and the output interpolated data from said first interpolating device.

9. A signal processing method of interpolating an output color signal from an image sensing device, comprising:

the first interpolation step of performing interpolation in a pixel position as an object of interpolation on the basis of pixel data in first and second directions;

the second interpolation step of performing interpolation in a pixel position as an object of interpolation on the basis of pixel data in the first direction;

the third interpolation step of performing interpolation in a pixel position as an object of interpolation on the basis of pixel data in the second direction;

the selection step of determining correlations in the first and second directions with respect to a signal at a pixel position as an object of interpolation and, on the basis of the determination result, selecting interpolated data based on an output from one of the second and third interpolation steps; and the output step of outputting an interpolated signal on the basis of interpolated data, which is based on an output from the first interpolation step, and the output interpolated data from the selection step, wherein if it is expected to be determined that the correlations in the first and second directions would become equal, the output step comprises generating the interpolated signal by performing weighting such that the interpolated data based on the output from the first interpolation step is weighted more than the output interpolated data from the selection step.

10. A signal processing method of interpolating an output color signal from an image sensing device, comprising:

the first interpolation step of performing interpolation in a pixel position as an object of interpolation on the basis of pixel data in first and second directions;

the second interpolation step of performing interpolation in a pixel position as an object of interpolation on the basis of pixel data in the first direction;

the third interpolation step of performing interpolation in a pixel position as an object of interpolation on the basis of pixel data in the second direction;

the selection step of determining correlations in the first and second directions with respect to a signal at a pixel position as an object of interpolation and, on the basis of the determination result, selecting interpolated data based on an output from one of the second and third interpolation steps; and the output step of outputting an interpolated signal on the basis of interpolated data, which is based on an output from the first interpolation step, and the output interpolated data from the selection step, wherein the second interpolation step comprises performing interpolation on the basis of pixel data, in the first direction, over a broader range than that when the first interpolation step performs interpolation.

11. A signal processing method of interpolating an output color signal from an image sensing device, comprising:

the first interpolation step of performing interpolation in a pixel position as an object of interpolation on the basis of pixel data in first and second directions;

the second interpolation step of performing interpolation in a pixel position as an object of interpolation on the basis of pixel data in the first direction;

the third interpolation step of performing interpolation in a pixel position as an object of interpolation on the basis of pixel data in the second direction;

the selection step of determining correlations in the first and second directions with respect to a signal at a pixel position as an object of interpolation and, on the basis of the determination result, selecting interpolated data based on an output from one of the second and third interpolation steps; and the output step of outputting an interpolated signal on the basis of interpolated data, which is based on an output from the first interpolation step, and the output interpolated data from the selection step, wherein the third interpolation step comprises performing interpolation on the basis of pixel data, in the second direction, over a broader range than that when the first interpolation step performs interpolation.

12. A storage medium storing an operation process program for interpolating an output color signal from an image sensing device, said operation process program comprising:

the first interpolation step of performing interpolation in a pixel position as an object of interpolation on the basis of pixel data in first and second directions;

the second interpolation step of performing interpolation in a pixel position as an object of interpolation on the basis of pixel data in the first direction;

the third interpolation step of performing interpolation in a pixel position as an object of interpolation on the basis of pixel data in the second direction;

the selection step of determining correlations in the first and second directions with respect to a signal at a pixel position as an object of interpolation and, on the basis of the determination result, selecting interpolated data based on an output from one of the second and third interpolation steps; and the output step of outputting an interpolated signal on the basis of interpolated data, which is based on an output from the first interpolation step, and the output interpolated data from the selection step, wherein if it is expected to be determined that the correlations in the first and second directions would become equal, the output step comprises generating the interpolated signal by performing weighting such that the interpolated data based on the output from the first interpolation step is weighted more than the output interpolated data from the selection step.

13. A storage medium storing an operation process program for interpolating an output color signal from an image sensing device, said operation process program comprising:
- the first interpolation step of performing interpolation in a pixel position as an object of interpolation on the basis of pixel data in first and second directions;
- the second interpolation step of performing interpolation in a pixel position as an object of interpolation on the basis of pixel data in the first direction;
- the third interpolation step of performing interpolation in a pixel position as an object of interpolation on the basis of pixel data in the second direction;
- the selection step of determining correlations in the first and second directions with respect to a signal at a pixel position as an object of interpolation and, on the basis of the determination result, selecting interpolated data based on an output from one of the second and third interpolation steps; and
- the output step of outputting an interpolated signal on the basis of interpolated data, which is based on an output from the first interpolation step, and the output interpolated data from the selection step,
- wherein the second interpolation step comprises performing interpolation on the basis of pixel data, in the first direction, over a broader range than that when the first interpolation step performs interpolation.

14. A storage medium storing an operation process program for interpolating an output color signal from an image sensing device, said operation process program comprising:
- the first interpolation step of performing interpolation in a pixel position as an object of interpolation on the basis of pixel data in first and second directions;
- the second interpolation step of performing interpolation in a pixel position as an object of interpolation on the basis of pixel data in the first direction;
- the third interpolation step of performing interpolation in a pixel position as an object of interpolation on the basis of pixel data in the second direction;
- the selection step of determining correlations in the first and second directions with respect to a signal at a pixel position as an object of interpolation and, on the basis of the determination result, selecting interpolated data based on an output from one of the second and third interpolation steps; and
- the output step of outputting an interpolated signal on the basis of interpolated data, which is based on an output from the first interpolation step, and the output interpolated data from the selection step,
- wherein the third interpolation step comprises performing interpolation on the basis of pixel data, in the second direction, over a broader range than that when the first interpolation step performs interpolation.

* * * * *